United States Patent
Cyr et al.

(10) Patent No.: US 8,449,301 B2
(45) Date of Patent: May 28, 2013

(54) SYSTEMS AND METHODS FOR ASSESSING A MEDICAL ULTRASOUND IMAGING OPERATOR'S COMPETENCY

(75) Inventors: Dale Ronald Cyr, Rockville, MD (US); Paul Anthony Cardullo, South Dartmouth, MA (US); Paul Rufus Wagner, Boalsburg, PA (US); Eileen Mae Nemec, Robbinsdale, MN (US); Jo Ann Lamb, Seven Hills, OH (US); Bruce Kevin Daniels, Rochester, MN (US); Wayne Robert Hedrick, Akron, OH (US); Ellen Ruth Julian, Derwood, MD (US); Patricia Lucas Grier, Baltimore, MD (US); John Patrick Baker, Camberwell (AU); Clarence Lewis Chaffee, Jr., Vienna, VA (US)

(73) Assignee: American Registry for Diagnostic Medical Sonography, Inc., Rockville, MD (US)

(*) Notice: Subject to any disclaimer, the term of this patent is extended or adjusted under 35 U.S.C. 154(b) by 707 days.

(21) Appl. No.: 12/379,105

(22) Filed: Feb. 12, 2009

(65) Prior Publication Data

US 2010/0203487 A1 Aug. 12, 2010

(51) Int. Cl.
*G09B 23/28* (2006.01)

(52) U.S. Cl.
USPC .................................................. 434/262

(58) Field of Classification Search
USPC ....... 434/262, 263, 350, 351, 352, 353; 705/2
See application file for complete search history.

(56) References Cited

U.S. PATENT DOCUMENTS

| | | | |
|---|---|---|---|
| 4,360,345 A | 11/1982 | Hon | |
| 5,454,722 A | 10/1995 | Holland et al. | |
| 5,590,057 A * | 12/1996 | Fletcher et al. | 702/182 |
| 6,063,030 A * | 5/2000 | Vara et al. | 600/437 |
| 6,210,168 B1 * | 4/2001 | Aiger et al. | 434/262 |
| 6,361,323 B1 | 3/2002 | Beach et al. | |
| 6,535,714 B2 | 3/2003 | Melker et al. | |
| 6,546,230 B1 * | 4/2003 | Allison | 434/350 |
| 6,768,811 B2 | 7/2004 | Dinstein et al. | |

(Continued)

FOREIGN PATENT DOCUMENTS
WO WO 2007/100263 9/2007

OTHER PUBLICATIONS

The International Search Report and Written Opinion of the International Searching Authority re: PCT/US2010/024049 mailed Aug. 23, 2010.

(Continued)

*Primary Examiner* — Nikolai A Gishnock
*Assistant Examiner* — Sadaruz Zaman
(74) *Attorney, Agent, or Firm* — Sterne, Kessler, Goldstein & Fox, P.L.L.C.

(57) ABSTRACT

Methods and systems are provided for assessing a medical ultrasound imaging operator's competency. The system includes a console containing a plurality of virtual controls, such as knobs, for simulating a real-life examination of a patient. The images created by the system change dynamically as the different virtual knobs on the console are adjusted. The console provides a certification examination for a medical ultrasound imaging operator. The console also includes a process to assess the medical ultrasound imaging operator's competency. The process determines a plurality of scores in order to assess the competency of the medical ultrasound imaging operator.

16 Claims, 3 Drawing Sheets

U.S. PATENT DOCUMENTS

| | | | |
|---|---|---|---|
| 6,863,536 B1 | 3/2005 | Fisher et al. | |
| 7,263,710 B1 * | 8/2007 | Hummel et al. | 725/86 |
| 7,850,456 B2 * | 12/2010 | Chosack et al. | 434/272 |
| 7,912,258 B2 * | 3/2011 | Warmath et al. | 382/128 |
| 2002/0001794 A1 * | 1/2002 | Melker et al. | 434/350 |
| 2002/0127525 A1 | 9/2002 | Arington et al. | |
| 2003/0061070 A1 | 3/2003 | Kelly et al. | |
| 2004/0064298 A1 | 4/2004 | Levine | |
| 2004/0224294 A1 | 11/2004 | Heininger et al. | |
| 2005/0049457 A1 | 3/2005 | Leiner et al. | |
| 2005/0084833 A1 | 4/2005 | Lacey et al. | |
| 2005/0256743 A1 | 11/2005 | Dale | |
| 2006/0183095 A1 | 8/2006 | Korndorffer et al. | |
| 2006/0281063 A1 * | 12/2006 | McClain | 434/262 |
| 2007/0172803 A1 | 7/2007 | Hannaford et al. | |
| 2008/0026352 A1 | 1/2008 | Socher | |
| 2008/0085499 A1 * | 4/2008 | Horvath | 434/262 |
| 2008/0187896 A1 | 8/2008 | Savitsky | |

OTHER PUBLICATIONS

Extended European Search Report for International Application No. 10741779.2, PCT/US2010024049, European Patent Office, Munich, Germany, mailed on Mar. 6, 2013.

* cited by examiner

SYSTEMS AND METHODS FOR ASSESSING A MEDICAL ULTRASOUND IMAGING OPERATOR'S COMPETENCY

TECHNICAL FIELD

This disclosure is directed to systems and methods for evaluating medical ultrasound imaging performance, and more particularly, to sonography systems and methods for using simulated medical ultrasound imaging for purposes of evaluating competency.

BACKGROUND

Medical ultrasound imaging relates to the techniques and processes used for creating images of the human body for clinical purposes, such as for diagnostic or medical examination purposes. Medical ultrasound imaging is a diagnostic imagine technique used to visualize and evaluate superficial and internal organs, their size, structures and possible pathologies or lesions. Medical ultrasound imaging is used in all facets of clinical care, for example, cardiology, neurology, vascular surgery, endocrinology, gastroenterology, gynecology, obstetrics, opthalmology, urology, musculoskeletal (tendons, muscles, nerves, and bone surfaces), and endovascular ultrasound, etc. These different medical ultrasound imaging techniques are performed on a patient's body by credentialed or certified technicians (sonographers) and physicians.

In order to earn credentials or a certificate, a candidate must have the necessary education and training and pass a certification examination. Typically, the certification examination consists of a series of multiple choice questions relating to still and video images of a patient's body. These images are typically recorded during real-life examinations of patients. In addition to multiple choice questions, during the test, the candidate might be tested on "knobology"—the manipulation of different controls (knobs) that affect image quality on an medical ultrasound imaging instrument. While the multiple choice questions test a candidate's medical and diagnostic knowledge, knobology tests the candidate's performance on the medical ultrasound imaging instrument to produce the necessary images and make a proper diagnosis.

Past efforts have been made to create a more interactive examination by simulating real-life examinations of patients. However, these simulations of real-life examinations of patients are, at best, quasi-simulations. For example, U.S. Pat. No. 6,210,168 to Aiger et al. on Apr. 3, 2001 ("the '168 patent"), discloses a method and system for simulating a Doppler ultrasound examination. In the simulator of the '168 patent, velocity and sound data describing blood flow at selected locations within blood vessels of a patient are gathered during an actual Doppler ultrasound examination. An operator of the simulator of the '168 patent performs an ultrasound examination on a mannequin using mock transducers. In the system of the '168 patent, images are created based on the pre-collected ultrasound data in accordance with the movement of the mock transducers along the mannequin.

Although the system disclosed in the '168 patent purportedly provides simulation of medical images, the system requires specialized components, such as mock transducers and a mannequin in order to provide the simulation. In addition, the system does not provide images that are fully simulated. Instead, the system of the '168 patent simulates images that are based on pre-collected ultrasound data gathered from real-life examinations.

The systems and methods of the present disclosure may be directed towards improvements in the existing technology.

SUMMARY OF THE EMBODIMENTS

In one embodiment, the present disclosure is directed to a method for assessing a medical ultrasound imaging operator's competency. The method may include generating a first image of a portion of a human body on a virtual medical ultrasound imaging console. The method may also include associating a plurality of virtual knobs with the virtual medical ultrasound imaging console. The method may further include displaying an examination item on the virtual medical ultrasound imaging console. The method may still further include receiving a response to the examination item. Moreover, the method may include generating an assessment score for the medical ultrasound imaging operator. The assessment score may be based on the response received.

In another embodiment, the present disclosure is directed to a system for assessing a medical ultrasound imaging operator's competency. The system may include a virtual console. The virtual console may be configured to present an examination item to the medical ultrasound imaging operator. The virtual console may include a plurality of virtual knobs. The plurality of virtual knobs may be configured to be adjustable by the medical ultrasound imaging operator and/or sonographer. The virtual console may also include an image section. The image section may include at least one medical image generated by the virtual console. The virtual console may further include an examination section on the virtual console. The examination section may include the examination item. The system may also include an input device connected to the virtual console. The input device may be configured to receive a response to the examination item from the medical ultrasound imaging operator. The system may further include an assessment module associated with the virtual console. The assessment module may be configured to generate an assessment score based on the response received.

In yet another embodiment, the present disclosure is direct to a system for assessing an ultrasound operator's competency. The system may include a virtual console. The virtual console may be configured to present an examination item to the ultrasound operator. The virtual console may include a plurality of virtual knobs. The plurality of virtual knobs may be configured to be adjustable by the ultrasound operator. The virtual console may also include a first image section. The first image section may include at least a first image generated by the virtual console. The virtual console may further include a second image section. The second image section may include at least a second image generated by the virtual console. The virtual console may still further include an examination section. The examination section may include the examination item. The system may also include an input device connected to the virtual console. The input device may be configured to receive response to the examination item from the ultrasound operator. The system may further include an assessment module. The assessment module may be configured to generate an assessment score based on the response received.

DESCRIPTION OF THE EMBODIMENTS

Figure 1:
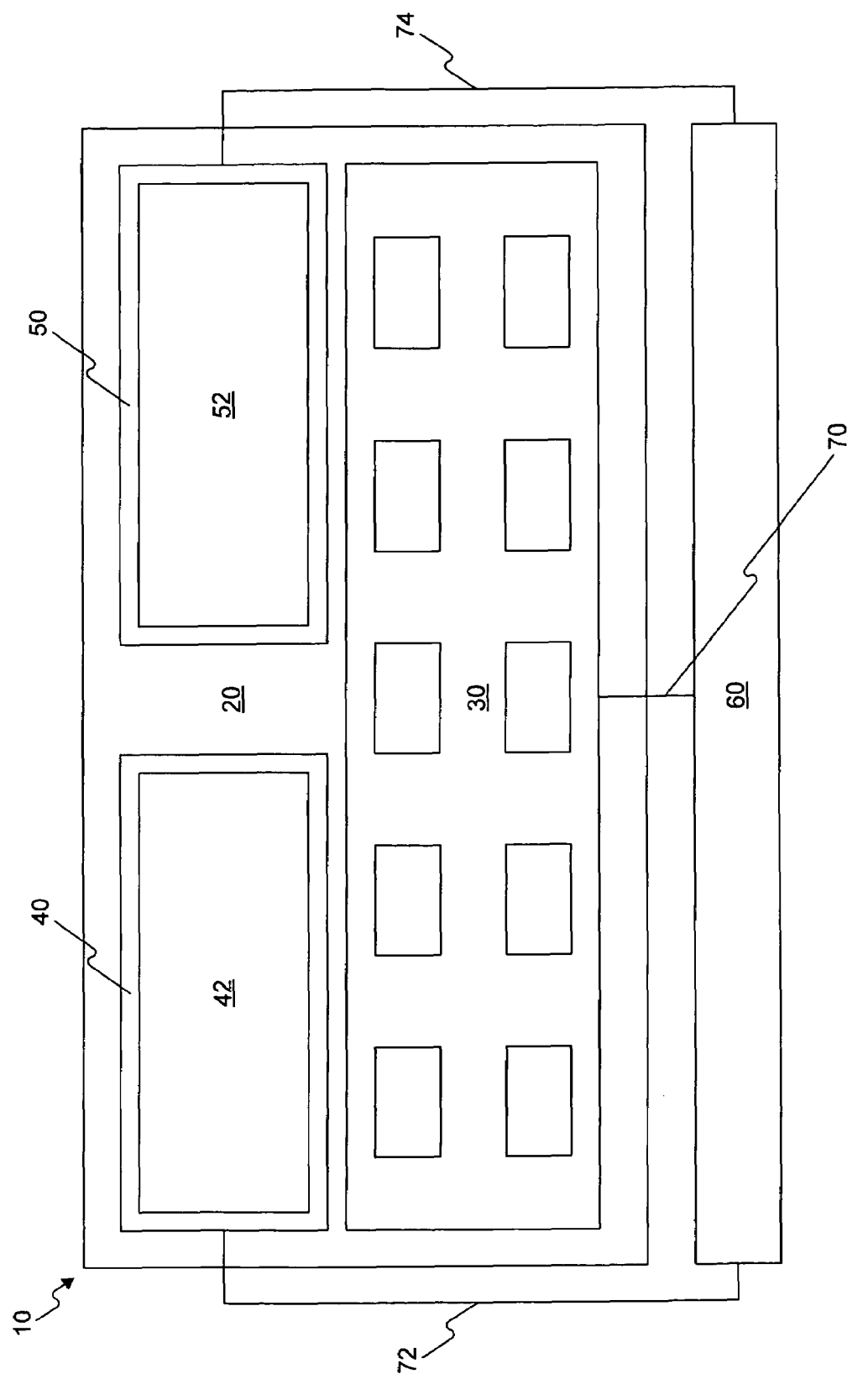
FIG. 1 is a schematic of an exemplary embodiment of a medical ultrasound imaging simulation system.

An exemplary embodiment of a medical ultrasound imaging simulation system 10 for simulating images for medical examination purposes is schematically illustrated in FIG. 1. Medical ultrasound imaging simulation system 10 may be used, for example, to simulate a real life ultrasound examination of a patient.

As shown in FIG. 1, exemplary medical ultrasound imaging simulation system 10 may include a console 20. Console 20 may be a virtual console, i.e., non-physical. Console 20 may include a knob (control) section 30, a first image section 40, and a second image section 50. Console 20 may generate a first image 42. First image 42 may be displayed in first image section 40. First image 42 may represent an ultrasound image of a portion of a human body. Console 20 may similarly generate a second image 52. Second image 52 may be displayed in second image section 50. Second image 52 may represent a Doppler image. In some embodiments, first image 42 and/or second image 52 may represent an image typically generated with any medical examination. For example, first image 42 and/or second image 52 may represent a skeletal image of a human being.

Knob section 30 may include a plurality of knobs (controls). It is contemplated that the plurality of knobs may be virtual, i.e., non-physical, knobs. It is also contemplated that the plurality of knobs may be generated by console 20 or any appropriate component of medical ultrasound imaging simulator 10. For example, the plurality of knobs may include parameters relating to generation of an ultrasound image and/or a Doppler image, such as a frequency knob, a cursor knob, an inverting knob, a gate knob, an angle knob, a sample volume knob, a baseline knob, and/or a waveform selection knob, etc. In some embodiments, the plurality of knobs may include parameters relating to different time gain knobs. In some embodiments, the plurality of knobs may include parameters generally associated with a particular medical examination. For example, when medical ultrasound imaging simulation system 10 is used for musculoskeletal examination, the plurality of knobs may includes parameters relating to high-frequency imaging, tendon, muscle and bone density, etc. An operator using console 20 may adjust the plurality of knobs in knob section 30. In certain embodiments, the operator may adjust the knobs using a mouse, trackball, or other computer input device.

Console 20 may generate a modified first image 44 and/or a modified second image 54 (not shown). Modified first image 44 may be a modified image of first image 42. Modified second image 54 may be a modified image of second image 52. Modified first image 44 and modified second image 54 may be generated in response to adjustments made to one or more of the knobs in knob section 30. For example, in response to an ultrasound first image 42, the operator may adjust knobs in knob section 30 to alter the baseline of first image 42 and produce modified first image 44. It is contemplated that first image 42, modified first image 44, second image 52, and/or modified second image 54 may be generated based on medical physical principles. It is also contemplated that modified first image 44 and modified second image 54 may be generated in real time in response to adjustment to at least one of the plurality of knobs in knob section 30. While FIG. 1 shows that first image 42 may be displayed in first image section 40, it should be appreciated that when modified first image 44 is generated, modified first image 44 may be displayed in first image section 40 to replace first image 42. Similarly, while FIG. 1 shows second image 52 may be displayed in second image section 50, it should be appreciated that when modified second image 54 is generated, modified second image 54 may be displayed in second image section 50 to replace second image 52.

In some embodiments, medical ultrasound imaging simulation system 10 may include an image generator 60. As illustrated in FIG. 1, image generator 60 may be external to console 20. However, it is contemplated that image generator 60 may be internal to console 20, such that image generator 60 may be a part of console 20. Image generator 60 may be connected to various components of medical ultrasound imaging simulation system 10. For example, image generator 60 may be connected to knob section 30, first image section 40, and second image section 50 via connections 70, 72 and 74, respectively. In some embodiments, image generator 60 may be connected to each of the plurality of knobs in knob section 30 via a plurality of connections (not shown). Image generator 60 may receive input signals from knob section 30 that may represent adjustments made to the plurality of knobs in knob section 30. Depending on the input signals, image generator 60 may provide output signals to first image section 40 and/or second image section 50 via connections 72 and 74, respectively. Depending on the output signals, first image 42 or modified first image 44 may be displayed in first image section 40, and second image 52 or modified second image 54 may be displayed in second image section 50.

Figure 2:
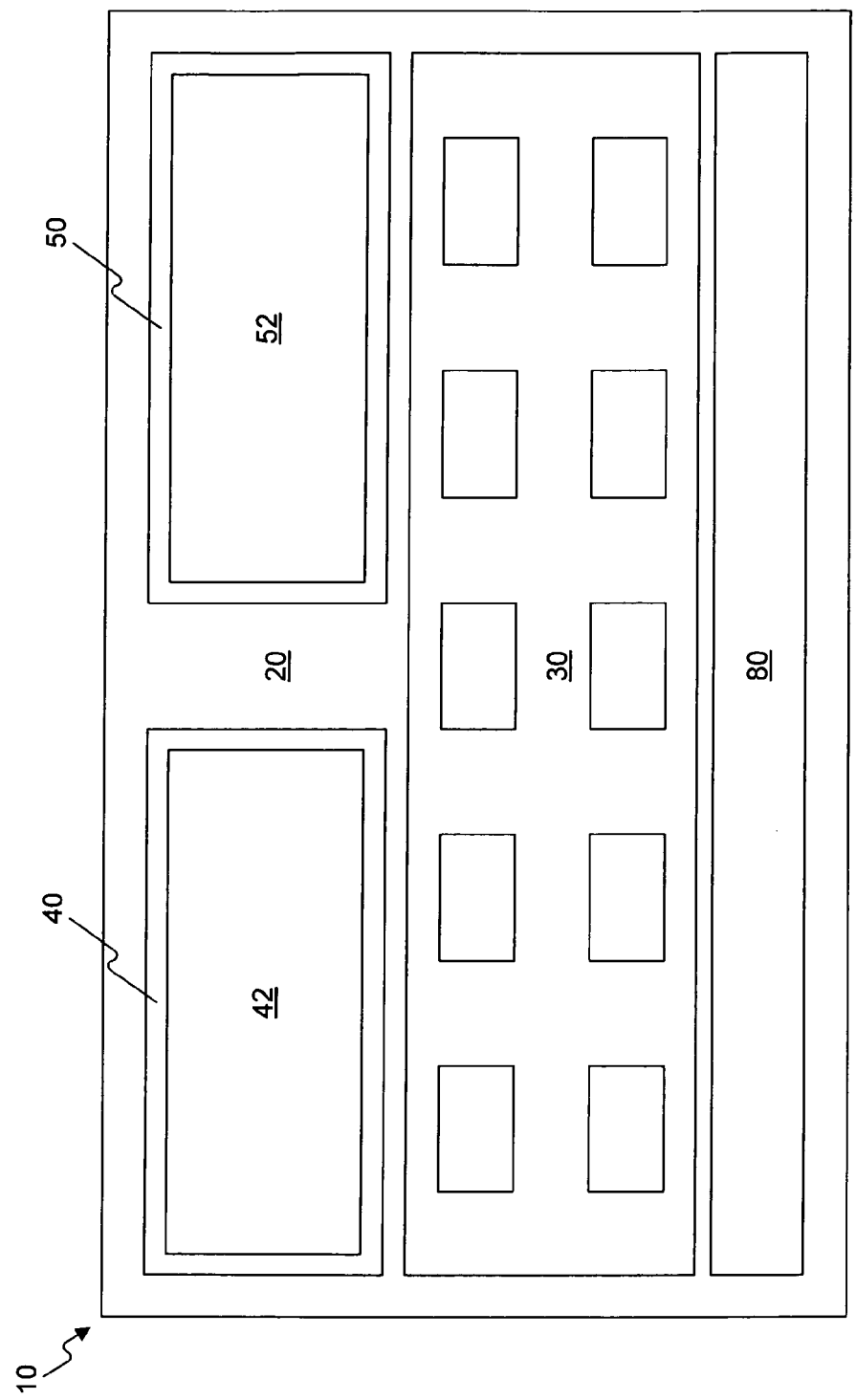
FIG. 2 is a schematic of another exemplary embodiment of a medical ultrasound imaging simulation system.

Referring to FIG. 2, in some embodiments, console 20 may include an examination section 80. Examination section 80 may include, for example, a certification examination for testing a medical ultrasound imaging technician's competency. It is understood that a medical ultrasound imaging operator may earn credentials or a certificate by taking the certification examination. For example, examination section 80 may include a question and a list of possible answers. A candidate taking the certification examination may respond to the question by selecting one or more answers from the list. In some embodiments, the candidate may respond to the question by selecting a button, an element, and/or a spot on console 20. In other embodiments, the candidate may respond to the question by dragging an icon or text to a position on console 20.

Examination section 80 may include a task to be performed by the candidate. The task may be included in addition to or instead of the question included in examination section 80. For example, the task may ask the candidate to adjust the plurality of knobs to generate a desired modified first image 44 and/or a desired modified second image 54. In some embodiments, the candidate may be ask to provide a diagnosis based on the generated modified first image 44 and/or second image 54. It is contemplated that one or more tasks and/or one or more questions may be included in examination section 80. Console 20 may receive at least one response to the tasks and/or questions included in examination section 80.

In some embodiments, medical ultrasound imaging simulation system 10 may include a central processing unit (not shown) for interfacing with console 20 and performing the necessary certification examination functions. The central processing unit may include a microcomputer, a microprocessor, an electronic control module, etc. The central processing unit may include an assessment module (not shown) for assessing the candidate's competency in taking the certification examination. The assessment module may include an assessment algorithm for assessing the candidate's competency. The assessment algorithm may determine a plurality of scores. The plurality of scores may include an assessment score, a performance score, an accuracy score, and an efficiency score.

For example, the performance score may include a score associated with the candidate's adjustments of knobs in knob section 30. For example, to determine the performance score, first image 42 may be simulated, and a candidate may be prompted by examination section 80 to adjust one or more of the knobs in knob section 30 in order to produce a desired modified first image 44. The candidate's adjustment to the one or more knobs and the final settings associated with the one or more knobs may be used in generating the performance score. Similarly, the accuracy score may include a score associated with a diagnosis provided by the candidate based on first image 42, modified first image 44, second image 52, and/or modified second image 54. For example, to determine the accuracy score, first image 42 and/or second image 52 may be simulated, and a candidate may be prompted by examination section 80 to adjust one or more of the knobs in knob section 30 in order to produce a desired modified first image 44 and/or modified second image 54. The candidate may then be asked to provide a diagnosis based on modified first image 44 and/or modified second image 54. The candidate's diagnosis may be used in generating the accuracy score. The efficiency score may include a score associated with the efficiency of the candidate's execution of a task from the examination section 80. For example, to determine the accuracy score, first image 42 and/or second image 52 may be simulated, and a candidate may be prompted by examination section 80 to adjust one or more of the knobs in knob section 30 in order to produce a desired modified first image 44 and/or modified second image 54. The process by which the candidate arrives at the desired modified first image 44 and/or modified second image 54 may be used in generating the efficiency score. It is contemplated that medical ultrasound imaging simulation system 10 may provide the candidate with the assessment score. The assessment score may inform the candidate of his or her overall performance on the certification examination. The assessment score may include at least one of the performance score, the accuracy score, and/or the efficiency score.

In some embodiments, medical ultrasound imaging simulation system 10 may include a memory (not shown) for storing data relating to generation of first image 42, modified first image 44, second image 52, and/or modified second image 54. The memory may also store data relating to questions, tasks, and responses to be included in examination section 80. The memory may further store data relating to assessment of the candidate's competency, etc.

Figure 3:
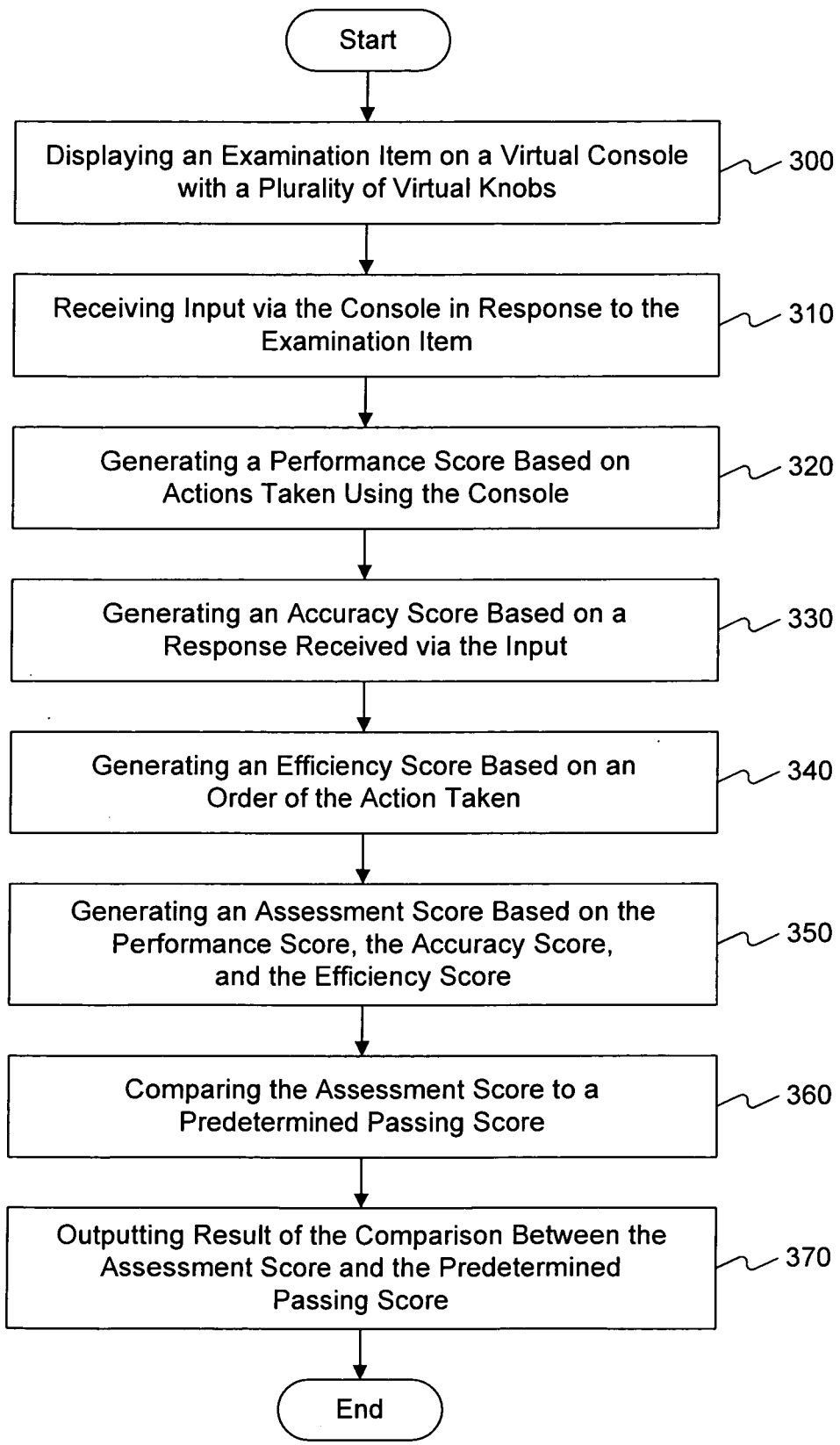
FIG. 3 is an exemplary embodiment of a method for assessing a medical ultrasound imaging operator's competency.

An exemplary embodiment of a method for assessing a medical ultrasound imaging operator's competency may be shown in FIG. 3. The exemplary method for assessing a candidate's competency may begin at Step 300 with displaying an examination item on a console associated with a plurality of knobs. In certain embodiments, the examination item may be a question displayed on examination section 80. For example, during an examination, a candidate may be asked to modify first image 42 and/or second image 52. The candidate may be required to adjust knobs in knob section 30 of console 20 to produce an acceptable modified first image 44 and/or modified second image 54. In another example, the candidate may be required to interpret modified first image 44 and/or modified second image 54 and respond to a question based on his or her interpretation of modified first image 44 and/or modified second image 54. For example, in Step 310, a response to the examination item may be received. In Step 320, a performance score may be generated. In certain embodiments, the performance score may be based on modified first image 44 and/or modified second image 54. For example, the performance score may be based on final settings of the knobs when the candidate completes his or her response to the examination item by adjusting the knobs to generate modified first image 44 and/or modified second image 54.

The evaluation of the quality of modified first image 44 and/or modified second image 54, may be based on a predetermined value, such that if the candidate's final setting falls within a range of the predetermined value, then the performance score is set accordingly. The range of final settings that may yield an acceptable modified first image 44 and/or modified second image 54 may be determined, for example, by recording the results of a number of expert medical ultrasound imaging professionals using console 20 and the knobs to adjust first image 42 and/or second image 52 to their satisfaction. The range of the expert medical ultrasound imaging professionals' final settings, plus a specified margin (e.g., 10%), may determine the range within which a candidate's setting results in an acceptable performance score.

In some embodiments, the performance score may include the final setting of only one knob. In other embodiments, the performance score may include the final settings of multiple knobs. For example, where the response to an item only requires the adjustment of one of the knobs, i.e., a targeted knob, credit may be given for adjusting the targeted knob. Credit may also be given for not adjusting the rest of the plurality of knobs. For items where multiple knobs need to be adjusted, credit may be given for each knob that is set within the range of predetermined values. In addition, credit may be given for avoiding setting a knob to a dangerous level. On the other hand, credit may be reduced for setting a knob to a dangerous level.

In Step 330, an accuracy score may be generated, for example. The accuracy score may be based on generating modified first image 44 and/or modified second image 54, based on the adjustments to one or more knobs. The accuracy score may also be based on the correctness of the response to any associated items, e.g., interpretation questions. In some embodiments, interpretation questions may require interpretation of first image 42, second image 52, modified first image 44 and/or modified second image 54. Interpretation questions may include a variety of formats, such as:

(1) Drag and Drop—the candidate may respond by using an input device connected to console 20 (not shown), such as a mouse, to drag an icon or text to a position on a screen of console 20.

(2) Hot Spots—the candidate may respond by selecting a button, element or spot on the screen of console 20. The selection may also be carried out with the input device connected to console 20.

(3) Key List—the candidate may respond by selecting one or more buttons or items from a list on the screen of console 20.

(4) Fill in the Blank—the candidate may respond to a question where one or more words may replaced with blank spaces by providing responses in the blank spaces. It is contemplated that the responses provided may be numerical and/or textual. It is also contemplated that the responses may be provided via an input device connected to console 20, such as a keyboard. For example, credit may be given when the candidate provides one or more of the missing words. In certain embodiments, partial credit may be given, such that when a response requires the candidate to provide two missing words, credit may be given when the candidate provides one of the two missing words.

In Step 340, an efficiency score may be generated, for example. The efficiency score may include evaluation of a process performed by the candidate, such as a process through which a candidate arrives at modified first image 44 and/or modified second image 54. For example, credit may be given to the candidate who adjusts the plurality of knobs in the order that the expert medical ultrasound imaging professionals designate as optimal. An optimal order may be determined through an evaluation of the process the expert medical ultrasound imaging professionals use when responding to the same question. Alternatively, the optimal order may be generated through group discussion of the expert medical ultrasound imaging professionals. For another example, first image 42 and/or second image 52 may be displayed on console 20, and a candidate may be prompted by examination section 80 to adjust approximately 3-5 knobs to generate a desired modified first image 44 and/or modified second image 54. In certain embodiments, credit may be given if the candidate adjust between 3-5 knobs. Credit may be reduced if the candidate adjust more than 5 knobs, for example.

In Step 350, an assessment score may be generated. In some embodiments, the assessment score may be a combination of the performance score, the accuracy score, and/or the efficiency score. In other embodiments, the assessment score may be an average of the performance score, the accuracy score, and/or the efficiency score. For example, if the performance score is 80, the accuracy score is 90, and the efficiency score is 70, in certain embodiments, the assessment score may be the average of the three scores, such that the assessment score would be 80, e.g., (80+90+70)/3. In some embodiments, the assessment score may include subscores, based on the performance score, the accuracy score, and/or the efficiency score within different types of questions. For example, there may be an accuracy subscore for the drag and drop type of question. In addition, there may be an efficiency subscore for the key list type of question. The inclusion of subscores may facilitate assigning a weight to the performance score, the accuracy score, and/or the efficiency score for use in the generation of the assessment score. For example, the performance score may be assigned a weight of 50% of the assessment score, the accuracy score may be assigned a weight of 30% of the assessment score, and the efficiency score may be assigned a weight of 20% of the assessment score. The assessment score may be generated as a combination of the product of the weight that each of the performance score, the accuracy score, and the efficiency score is assigned and the actual scores. In such instance, if the performance score is 80, the accuracy score is 90, and the efficiency score is 70, the assessment score would be 81, e.g., (50%)(80)+(30%)(90)+(20%)(70).

In Step 360, the assessment score may be compared to a predetermined passing score in order to determine whether a candidate passes or fails the examination. In some embodiments, the candidate may pass the examination if his or her assessment score exceeds the predetermined passing score. In some embodiments, the candidate's performance score may be compared to a predetermined passing performance score, the candidate's accuracy score may be compared to a predetermined passing accuracy score, and the candidate's efficiency score may be compared to a predetermined passing efficiency score. In such instances, the candidate may pass the examination if each of his or her performance score, the accuracy score, and the efficiency score exceeds predetermined passing scores. Alternatively, the candidate may receive a passing assessment score if at least two of the subscores exceed predetermined passing scores. In Step 370, the result of the examination, e.g., pass or fail, may be outputted.

It will be apparent to those skilled in the art that various modifications and variations may be made to the exemplary systems and methods for simulating medical ultrasound imaging of the present disclosure without departing from the scope of the disclosure. Other embodiments will be apparent to those skilled in the art from consideration of the specification and practice of the systems and methods for simulating medical ultrasound imaging disclosed herein. It is intended that the specification and examples be considered as exemplary only, with a true scope of the disclosure being indicated by the following claims.

We claim:

1. A method for assessing a medical ultrasound imaging operator's competency, the method comprising:
    providing a first stored image of a portion of a human body on a virtual medical ultrasound imaging console;
    associating a plurality of virtual knobs with the virtual medical ultrasound imaging console;
    displaying an examination item related to the first stored image on the virtual medical ultrasound imaging console, wherein displaying an examination item includes displaying a task requiring user interaction with the first stored image using the plurality of virtual knobs to improve a quality of the first stored image;
    receiving a response to the examination item, wherein the response includes one or more adjustments to the plurality of virtual knobs that create a modified image from the first stored image; and
    generating an assessment score for the medical ultrasound imaging operator based on the response received.

2. The method of claim 1, wherein the response further includes at least one of:
    a selection of an answer from a list of possible answers displayed on the virtual medical ultrasound imaging console;
    a selection of at least one of a button, an element, and a spot on the virtual medical ultrasound imaging console;
    a movement of one of an icon and a text to a position on the virtual medical ultrasound imaging console; and
    entry of at least one of a numerical and a textual response on the virtual medical ultrasound imaging console.

3. The method of claim 2, wherein the response is received via an input device connected to the virtual medical ultrasound imaging console.

4. The method of claim 1 wherein generating the assessment score includes:
    generating a performance score based on the one or more adjustments to the plurality of virtual knobs by the medical ultrasound imaging operator using the virtual medical ultrasound imaging console;
    generating an accuracy score based on the one or more adjustments to the plurality of virtual knobs; and
    generating an efficiency score based on an order of the one or more adjustments to the plurality of virtual knobs by the medical ultrasound imaging operator using the virtual medical ultrasound imaging console.

5. The method of claim 1, further including:
    comparing the assessment score to a predetermined passing score; and
    outputting a result of a certification examination, including the examination item, the result being based on the comparison of the assessment score to the predetermined passing score.

6. A system for assessing a medical ultrasound imaging operator's competency, the system comprising:
- a virtual console configured to present an examination item to the medical ultrasound imaging operator, the virtual console including:
- a plurality of virtual knobs configured to be adjustable by the medical ultrasound imaging operator;
- an image section including at least one stored medical image generated by the virtual console; and
- an examination section including the examination item related to the stored medical image, wherein the examination item includes a task requiring user interaction with the stored medical image using the plurality of virtual knobs to improve a quality of the stored medical image;
- an input device connected to the virtual console, the input device being configured to receive a response to the examination item from the medical ultrasound imaging operator, the response including one or more adjustments to the plurality of virtual knobs that create a modified image from the stored medical image; and
- an assessment module associated with the virtual console, the assessment module being configured to generate an assessment score based on the response received.

7. The system of claim 6, wherein the examination item further includes at least one of a drag and drop question, a hot spots question, a key list question, and a fill in the blank question.

8. The system of claim 6, wherein the at least one response further includes at least one of:
- a selection of an answer from a list of possible answers displayed on the examination section of the virtual console;
- a selection of at least one of a button, an element, and a spot on the virtual console; and
- a movement of at least an icon and a text to a position on the virtual console; and a completion of at least one of a numerical and a textual response on the virtual console.

9. The system of claim 6, wherein the assessment module is further configured to:
- generate a performance score based on the one or more adjustments to the plurality of knobs by the medical ultrasound imaging operator using the virtual console;
- generate an accuracy score based on the one or more adjustments to the plurality of knobs;
- generate an efficiency score based on an order of the one or more adjustments to the plurality of knobs by the medical ultrasound imaging operator; and
- generate the assessment score based on the performance score, the accuracy score, and the efficiency score.

10. The system of claim 9, wherein the assessment module is further configured to:
- compare the assessment score to a predetermined passing score; and
- output a result of a certification examination, the certification examination including the examination item, based on the comparison of the assessment score to the predetermined passing score.

11. A system for assessing an ultrasound operator's competency, the system comprising:
- a virtual console configured to present an examination item to the ultrasound operator, the virtual console including:
- a plurality of virtual knobs configured to be adjustable by the ultrasound operator;
- a first image section including at least a first stored image provided by the virtual console;
- a second image section including at least a second stored image provided by the virtual console; and
- an examination section including an examination item, wherein the examination item is a task requiring user interaction with the stored image using the plurality of virtual knobs to improve a quality of at least one of the first stored image and the second stored image;
- an input device connected to the virtual console, the input device being configured to receive a response to the examination item from the ultrasound operator, the response including one or more adjustments to the plurality of virtual knobs that create a modified image from at least one of the first stored image and the second stored image; and
- an assessment module associated with the virtual console, the assessment module being configured to generate an assessment score based on the response received.

12. The system of claim 11, wherein the examination further item includes at least one of a drag and drop question, a hot spots question, a key list question, and a fill in the blank question.

13. The system of claim 11, wherein the at least one response further includes at least one of
- a selection of an answer from a list of possible answers displayed on the examination section of the virtual console;
- a selection of at least one of a button, an element, and a spot on the virtual console;
- a movement of at least an icon and a text to a position on the virtual console; and
- a completion of at least one of a numerical and a textual response on the virtual console.

14. The system of claim 13, wherein the first image section on the virtual console includes at least a modified first image generated by the virtual console based on the adjustment of the virtual knobs; and the second image section on the virtual console includes at least a modified second image generated by the virtual console based on the adjustment of the virtual knobs.

15. The system of claim 11, wherein the assessment module is further configured to:
- generate a performance score based on the one or more adjustments to the plurality of virtual knobs by the medical ultrasound imaging operator using the virtual console;
- generate an accuracy score based on the one or more adjustments to the plurality of virtual knobs;
- generate an efficiency score based on an order of the one or more adjustments to the plurality of virtual knobs by the medical ultrasound imaging operator; and
- generate the assessment score based on the performance score, the accuracy score, and the efficiency score.

16. The system of claim 15, wherein the assessment module is further configured to:
- compare the assessment score to a predetermined score; and
- output a result of a certification examination, including the examination item, the result being based on the comparison of the assessment score to the predetermined passing score.

* * * * *